Nov. 16, 1954  B. C. EVERS  2,694,746
BATTERY CONTACT SUPPORT
Filed Nov. 17, 1952
Fig. 1
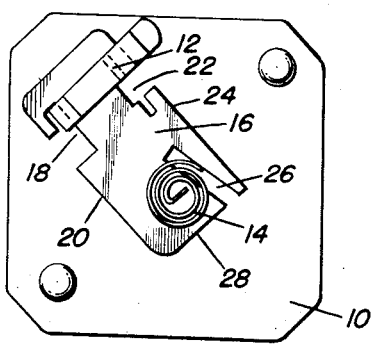
Fig. 3
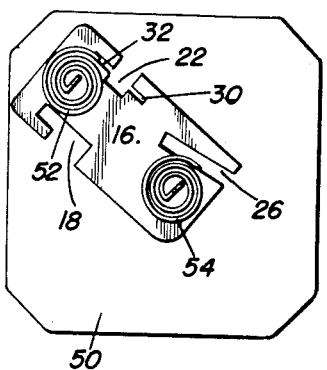
Fig. 2
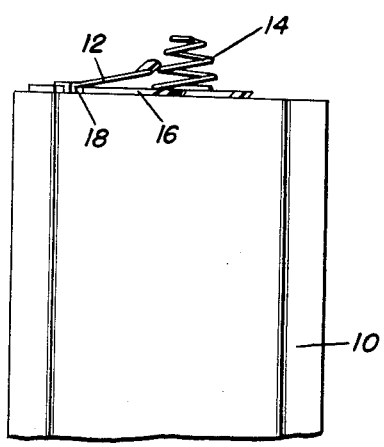
Fig. 4
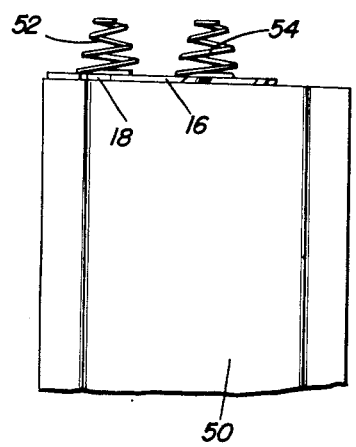
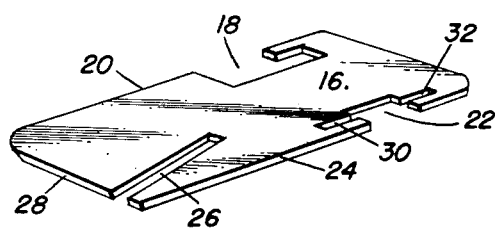
Fig. 5
Bert C. Evers
INVENTOR.
BY *Clarence A. O'Brien*
*and Harvey B. Jacobson*
Attorneys

United States Patent Office 2,694,746
Patented Nov. 16, 1954

2,694,746

BATTERY CONTACT SUPPORT

Bert C. Evers, Glendive, Mont.

Application November 17, 1952, Serial No. 321,021

1 Claim. (Cl. 136—181)

This invention relates to a battery contact support adapted for use in supporting the vertical extending resilient or spring contacts used on presently manufactured six-volt dry batteries.

The principal object of this invention is to provide a battery contact support that will satisfactorily prevent the battery contacts from being depressed or forced into the body of the battery proper so as to break contact and cause the lantern or other piece of equivalent in which the battery is being used to become inoperative.

This invention features the use of a flat, substantially rectangular body of insulative material such as Bakelite, or any other suitable synthetic plastic such as the phenolic resins, cellulose acetate, or polystyrene. The body is provided with peripheral slots or notches which are adapted to receive various types of spring contacts used on currently manufactured batteries so as to support these contacts above the body of the battery. Hence, when the battery is placed in a container in which it is to be used, the spring contacts will be forced against the battery contact support rather than against the body of the battery itself. This will prevent the spring contacts from entering into the body of the battery itself thus ensuring a longer life to the battery and more reliable and satisfactory operation of the equipment itself.

Still further objects of the invention reside in the provision of a battery contact plate that is strong, durable, highly efficient in operation, extremely simple in construction and very inexpensive to produce.

These, together with the various ancillary objects of the invention which will become apparent as the following description proceeds, are attained by this battery contact support, a preferred embodiment of which has been illustrated in the accompanying drawings, by way of example only, wherein:

Figure 1 is a top plan view of the battery contact support shown in operative emplacement on a battery having both a flat spring and a coiled spring such as manufactured by the Eveready Company;

Figure 2 is a side elevational view showing the invention as installed on the Eveready battery;

Figure 3 is a top plan view of the battery support plate in operative emplacement on a Burgess F4N type battery which is provided with two coil spring contacts;

Figure 4 is a side elevational view of the invention shown in operative emplacement in cooperation with the same type of battery as is shown in Figure 3; and Figure 5 is a perspective view of the battery contact support comprising the present invention.

With continuing reference to the accompanying drawings wherein like reference numerals designate similar parts throughout the various views, reference numeral 10 generally designates a battery having a flat spring contact 12 and a coil spring contact 14 of the type manufactured by the Eveready Company. In order to support the flat contact spring 12 and the coil spring contact 14 so as to prevent these contacts from being forced into the battery proper by the pressure exerted by the springs when in operative use, there is provided the battery contact support 16. This battery contact support 16 is a flat, substantially rectangular plate of Bakelite or other suitable insulating material such as a phenolic resin, cellulose acetate, or polystyrene. A substantially L-shaped recess 18 is formed in one of the sides 20 of the battery contact support 16 and opens into the periphery of the plate. The plate 16 is further provided with a substantially T-shaped notch or slot 22 which opens into the side 24 of the plate 16. The T-shaped recess 22 is opposed to the L-shaped slot 18.

An angularly extending rectangular shaped slot 26 is formed in the plate 16 and opens into the periphery of the plate 16 at the side 28 of the substantially rectangular plate 16. The recess 26 is particularly adapted to receive the coil spring contact 14.

Referring now to Figures 3 and 4, it will be seen that herein is provided a battery 50 having coil spring contacts 52 and 54. The coil spring contacts 52 and 54 are adapted to become engaged within the slots or notches 22 and 26 in the battery contact support plate 16. To install the plate 16 on the battery 50, it is merely necessary to position the plate with the spring 52 entering into the notch 22. Then, with the spring pressed into the recessed portion 30 of the notch or slot 22, the spring 54 may be directed upwardly into the slot or notch 26. Then, the contact support plate 16 may be pushed downwardly until the spring 52 is engaged within the recessed portion 32 of the T-shaped slot or notch 22. This will lockingly hold the battery contact support plate 16 in position.

Since from the foregoing, the construction and advantages of this battery contact support are readily apparent, further description is believed to be unnecessary.

However, since numerous modifications will readily occur to those skilled in the art after a consideration of the foregoing specification and the accompanying drawings, it is not intended to limit the invention to the precise embodiment shown and described, but all suitable modifications and equivalents may be readily resorted to which fall within the scope of the appended claim.

What is claimed as new is as follows:

A battery contact support adapted to prevent the resilient contacts of a battery from being pushed into a battery during use comprising a plate of electrically insulative material, said plate having a plurality of slots therein opening into the peripheral edge of said plate, at least one of said slots being angulated in shape to form retaining means adapted to prevent disengagement of a contact from said plate.

References Cited in the file of this patent

UNITED STATES PATENTS

| Number | Name | Date |
|---|---|---|
| 1,377,086 | MacDonald | May 3, 1921 |
| 1,546,359 | Baird | July 21, 1925 |
| 2,355,197 | Anthony et al. | Aug. 8, 1944 |

FOREIGN PATENTS

| Number | Country | Date |
|---|---|---|
| 290,481 | Germany | Feb. 27, 1915 |
| 221,046 | Great Britain | Sept. 4, 1924 |
| 593,768 | France | Aug. 31, 1925 |